United States Patent
Pandurangan et al.

(10) Patent No.: US 10,317,875 B2
(45) Date of Patent: Jun. 11, 2019

(54) PUMP INTEGRITY DETECTION, MONITORING AND ALARM GENERATION

(71) Applicants: Pradeep Pandurangan, Houston, TX (US); Gregory E. Griffith, Spring, TX (US); Thomas Jaeger, The Woodlands, TX (US); Gulshan Singh, The Woodlands, TX (US)

(72) Inventors: Pradeep Pandurangan, Houston, TX (US); Gregory E. Griffith, Spring, TX (US); Thomas Jaeger, The Woodlands, TX (US); Gulshan Singh, The Woodlands, TX (US)

(73) Assignee: BJ Services, LLC, Tomball, TX (US)

( * ) Notice: Subject to any disclaimer, the term of this patent is extended or adjusted under 35 U.S.C. 154(b) by 442 days.

(21) Appl. No.: 14/871,641

(22) Filed: Sep. 30, 2015

(65) Prior Publication Data
US 2017/0090457 A1    Mar. 30, 2017

(51) Int. Cl.
*G05B 19/406* (2006.01)
*E21B 43/12* (2006.01)
(Continued)

(52) U.S. Cl.
CPC .......... *G05B 19/406* (2013.01); *E21B 43/121* (2013.01); *E21B 43/25* (2013.01);
(Continued)

(58) Field of Classification Search
CPC ................................ G05B 15/02; G05B 17/02
(Continued)

(56) References Cited

U.S. PATENT DOCUMENTS

| | | | | | |
|---|---|---|---|---|---|
| 4,094,191 A | * | 6/1978 | Goetsch | ................ | G01M 13/00 73/114.41 |
| 5,023,599 A | * | 6/1991 | Mitchell | .................. | B60Q 1/44 340/463 |

(Continued)

FOREIGN PATENT DOCUMENTS

| | | |
|---|---|---|
| WO | 2003091614 A1 | 11/2003 |
| WO | 2004102052 A1 | 11/2004 |
| WO | 2008118775 A1 | 10/2008 |

OTHER PUBLICATIONS

International Search Report and the Written Opinion of the International Searching Authority, or the Declaration; PCT/US/2016/048659; dated Dec. 5, 2016, 13 pages.
(Continued)

*Primary Examiner* — Michael T Tran
(74) *Attorney, Agent, or Firm* — Bracewell LLP; Constance G. Rhebergen; Keith R. Derrington

(57) ABSTRACT

An embodiment includes a method of monitoring a fluid pump that includes receiving time domain measurement data indicating vibrations occurring in a fluid pump, and filtering the measurement data to remove measurement data components having frequencies below a threshold frequency, the removed measurement data components associated with cyclical motions of the fluid pump. The method also includes dividing the filtered measurement data into a plurality of subsets, each subset corresponding to a pump cycle, and estimating a peak count for each subset, the peak count being a number of peaks having an amplitude that exceeds a selected amplitude threshold, the amplitude threshold associated with impacts between internal components of the pump. The method further includes comparing the peak count with an expected peak count, and determining whether the pump is in a condition selected from at least one of a
(Continued)

wear condition and a failure condition based on the comparison.

20 Claims, 11 Drawing Sheets

(51) Int. Cl.
| | |
|---|---|
| E21B 43/25 | (2006.01) |
| E21B 43/26 | (2006.01) |
| E21B 47/00 | (2012.01) |
| G08B 21/18 | (2006.01) |
| G08B 25/08 | (2006.01) |
| F04B 47/00 | (2006.01) |
| F04C 14/00 | (2006.01) |
| F04C 14/28 | (2006.01) |
| F04B 49/06 | (2006.01) |
| F04B 49/10 | (2006.01) |
| F04B 53/00 | (2006.01) |

(52) U.S. Cl.
CPC .......... *E21B 43/26* (2013.01); *E21B 47/0007* (2013.01); *F04B 47/00* (2013.01); *F04B 49/06* (2013.01); *F04B 49/065* (2013.01); *F04B 49/10* (2013.01); *F04B 53/001* (2013.01); *F04C 14/00* (2013.01); *F04C 14/28* (2013.01); *G08B 21/182* (2013.01); *G08B 21/185* (2013.01); *G08B 25/08* (2013.01); *F04C 2270/125* (2013.01); *G05B 2219/45208* (2013.01); *G05B 2219/50185* (2013.01)

(58) Field of Classification Search
USPC .................................................. 700/282, 283
See application file for complete search history.

(56) References Cited

U.S. PATENT DOCUMENTS

| | | | | |
|---|---|---|---|---|
| 5,332,356 | A * | 7/1994 | Gulich | F04D 29/669 415/118 |
| 5,550,786 | A * | 8/1996 | Allen | G01V 1/366 367/23 |
| 5,563,351 | A | 10/1996 | Miller | |
| 5,703,833 | A * | 12/1997 | Allen | G01V 1/04 367/189 |
| 5,715,213 | A * | 2/1998 | Allen | G01V 1/04 181/111 |
| 5,720,598 | A | 2/1998 | Chizzelle De | |
| 6,161,076 | A * | 12/2000 | Barr | G01V 1/36 367/117 |
| 6,859,740 | B2 | 2/2005 | Stephenson et al. | |
| 6,882,960 | B2 | 4/2005 | Miller | |
| 7,013,223 | B1 * | 3/2006 | Zhang | F02M 65/003 417/53 |
| 7,401,500 | B2 | 7/2008 | Wago et al. | |
| 7,557,562 | B2 | 7/2009 | Myers et al. | |
| 7,581,449 | B2 | 9/2009 | Miller | |
| 7,623,986 | B2 | 11/2009 | Miller | |
| 7,643,945 | B2 | 1/2010 | Baklanov et al. | |
| 7,757,562 | B2 | 6/2010 | Mercer | |
| 7,992,633 | B2 * | 8/2011 | Donald | E21B 33/03 166/75.12 |
| 8,366,402 | B2 | 2/2013 | St. Michel et al. | |
| 8,437,922 | B2 | 5/2013 | Douglas | |
| 8,543,245 | B2 | 9/2013 | Heitman et al. | |
| 8,554,494 | B2 | 10/2013 | Adnan et al. | |
| 8,979,505 | B2 * | 3/2015 | Pessin | E21B 47/0008 251/359 |
| 9,429,010 | B2 * | 8/2016 | Winters | E21B 47/06 |
| 9,441,468 | B1 * | 9/2016 | Pryor | E21B 43/124 |
| 9,822,776 | B2 * | 11/2017 | Pop | E21B 49/10 |
| 10,125,558 | B2 * | 11/2018 | Sun | E21B 47/06 |
| 10,138,697 | B2 * | 11/2018 | Guidry | E21B 33/03 |
| 2002/0123856 | A1 | 9/2002 | Eryurek | |
| 2004/0112115 | A1 | 6/2004 | Ramamoorthy et al. | |
| 2004/0129456 | A1 * | 7/2004 | Vail, III | E21B 7/065 175/57 |
| 2005/0060096 | A1 * | 3/2005 | Hutchinson | E21B 44/00 702/6 |
| 2006/0020390 | A1 * | 1/2006 | Miller | E21B 44/00 702/11 |
| 2006/0071666 | A1 | 4/2006 | Unsworth et al. | |
| 2006/0219262 | A1 * | 10/2006 | Peterson | A47L 15/4244 134/18 |
| 2006/0228225 | A1 | 10/2006 | Rogers | |
| 2006/0266913 | A1 * | 11/2006 | McCoy | E21B 47/0007 248/550 |
| 2007/0038393 | A1 * | 2/2007 | Borah | C10B 41/04 702/56 |
| 2007/0276544 | A1 * | 11/2007 | Dainez | F04B 35/045 700/281 |
| 2008/0006089 | A1 | 1/2008 | Adnan et al. | |
| 2008/0138224 | A1 | 6/2008 | Vicars | |
| 2009/0063055 | A1 * | 3/2009 | Schneider | E21B 21/08 702/9 |
| 2010/0050762 | A1 * | 3/2010 | Nold, III | E21B 49/008 73/152.51 |
| 2010/0101785 | A1 * | 4/2010 | Khvoshchev | E21B 34/16 166/250.01 |
| 2010/0185142 | A1 * | 7/2010 | Kamen | A61M 5/14224 604/66 |
| 2010/0300683 | A1 * | 12/2010 | Looper | E21B 21/06 166/250.01 |
| 2011/0125332 | A1 | 5/2011 | Heitman et al. | |
| 2011/0167910 | A1 * | 7/2011 | Storm | G01F 1/74 73/32 A |
| 2011/0189028 | A1 * | 8/2011 | Shampine | F04B 49/06 417/53 |
| 2011/0199228 | A1 * | 8/2011 | Roddy | E21B 33/13 340/856.4 |
| 2012/0217067 | A1 * | 8/2012 | Mebane, III | E21B 44/02 175/57 |
| 2012/0283581 | A1 * | 11/2012 | Olde | A61B 5/02 600/485 |
| 2013/0032401 | A1 * | 2/2013 | Edbury | E21B 7/06 175/24 |
| 2013/0068550 | A1 * | 3/2013 | Gale | B60G 3/145 180/216 |
| 2013/0099931 | A1 | 4/2013 | Wetherill et al. | |
| 2013/0140031 | A1 * | 6/2013 | Cohen | E21B 43/26 166/308.1 |
| 2013/0182023 | A1 * | 7/2013 | Hung | B41J 2/17596 347/6 |
| 2013/0230121 | A1 * | 9/2013 | Molko | H04L 27/2623 375/295 |
| 2014/0049883 | A1 * | 2/2014 | Kim | H02P 31/00 361/679.01 |
| 2014/0150545 | A1 * | 6/2014 | Hsu | E21B 49/088 73/152.24 |
| 2014/0332199 | A1 * | 11/2014 | Gilstad | E21B 28/00 166/53 |
| 2015/0025498 | A1 * | 1/2015 | Estes | G16H 20/17 604/506 |
| 2015/0218990 | A1 * | 8/2015 | Hudgens | F01N 3/2066 423/239.1 |
| 2015/0233197 | A1 * | 8/2015 | Oy | E21B 21/08 700/282 |
| 2015/0297832 | A1 * | 10/2015 | Blomquist | F04B 51/00 73/168 |
| 2016/0038675 | A1 * | 2/2016 | Estes | G06F 19/00 604/506 |
| 2016/0130940 | A1 * | 5/2016 | Hsu | E21B 49/10 702/11 |
| 2016/0262687 | A1 * | 9/2016 | Vaidyanathan | A61B 5/7264 |
| 2017/0016292 | A1 * | 1/2017 | Solem | E21B 44/00 |
| 2017/0328199 | A1 * | 11/2017 | Marsh | E21B 47/18 |

(56) References Cited

U.S. PATENT DOCUMENTS

2017/0343969 A1* 11/2017 Dykstra ............... G05B 13/042
2019/0017513 A1* 1/2019 Hillerup Lyhne .. F04D 15/0066

OTHER PUBLICATIONS

Albraik, et al.; "Diagnosis of Centrifugal Pump Faults Using Vibration"; 2012; Journal of Physics: Conference Series 364;IOP Publishing; 12 pages.

* cited by examiner

Good valve impact   peak count = 36

Worn valve impact   peak count = 68

Destroyed valve impact   peak count > 1000

PUMP INTEGRITY DETECTION, MONITORING AND ALARM GENERATION

BACKGROUND

Fluid pumps are utilized by the energy industry for numerous purposes related to exploration, evaluation and production of hydrocarbons. For example, positive displacement reciprocating pumps are used for applications such as drilling and hydraulic fracturing. Failure and wear of various components of a pump can reduce operational efficiency and can result in the loss of valuable equipment. For example, a leak in a suction cover or stuffing box in the fluid end of a reciprocating pump can cause the fluid end block to wash out. Techniques to monitor the health and integrity of such pumps are thus desirable to avoid equipment damage and provide effective energy industry operations.

SUMMARY

An embodiment includes a method of monitoring a fluid pump that includes receiving time domain measurement data from at least one sensor disposed at a fluid pump, the measurement data indicating vibrations occurring in the fluid pump, and filtering the measurement data to remove measurement data components having frequencies below a threshold frequency, the removed measurement data components associated with cyclical motions of the fluid pump. The method also includes dividing the filtered measurement data into a plurality of subsets, each subset corresponding to a pump cycle, and estimating a peak count for each subset, the peak count being a number of peaks having an amplitude that exceeds a selected amplitude threshold, the amplitude threshold associated with impacts between internal components of the pump. The method further includes comparing the peak count with an expected peak count, and determining whether the pump is in a condition selected from at least one of a wear condition and a failure condition based on the comparison.

An embodiment of a pump monitoring system includes at least one sensor disposed at a fluid pump, and a processor configured to perform receiving time domain measurement data from the at least one sensor, the measurement data indicating vibrations occurring in the fluid pump, and filtering the measurement data to remove measurement data components having frequencies below a threshold frequency, the removed measurement data components associated with cyclical motions of the fluid pump. The processor is also configured to perform dividing the filtered measurement data into a plurality of subsets, each subset corresponding to a pump cycle, and estimating a peak count for each subset, the peak count being a number of peaks having an amplitude that exceeds a selected amplitude threshold, the amplitude threshold associated with impacts between internal components of the pump. The processor is further configured to perform comparing the peak count with an expected peak count, and determining whether the pump is in a condition selected from at least one of a wear condition and a failure condition based on the comparison.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Disclosed are systems and methods for monitoring the health and/or integrity of a pumping device. An embodiment of a method, performed by a processing device, includes collecting data from one or more sensors disposed at a pump (or pumps). Any suitable number of sensors are located at suitable locations at or in the pump (e.g., at or near a fluid end or valve assembly) to perform measurements and generate data related to vibrations and pump operation parameters. Exemplary measurement data includes, pump timing, pressure, acceleration, acoustic, vibration and/or velocity data. The method further includes dividing, filtering, transforming and computing characteristics of the signals to predict the health of the fluid end assembly.

The method includes filtering measurement data and calculating a number of peaks in the filtered data for each pump cycle that exceed a threshold number or baseline number of peaks. In one embodiment, a wear detection method or algorithm is executed by monitoring the per-cycle peak count over a time period during an energy operation and the progression or trend of the per-cycle peak count is analyzed over time to identify conditions indicative of valve or other component wear conditions that may require pump component replacement.

In one embodiment, the per-cycle peak count (e.g., statistical properties of the per-cycle peak count over time) is employed in a failure detection method or algorithm. that includes comparing the per-cycle peak count to a higher threshold than the baseline or threshold value used in the wear detection algorithm. The failure detection algorithm detects failure events (e.g., valve component or sealing component failures) that can occur suddenly. The failure detection algorithm is performed for a smaller period of time (e.g., number of cycles) that the period of time over which the wear detection algorithm is performed.

Various actions may be performed by the processing device in response to detection of wear conditions or failure conditions. For example, if the wear detection algorithm detects worn valves, an indication or alarm is transmitted to a user. If the failure detection algorithm detects a failure condition, an alarm may be transmitted to the user and/or the processing device may automatically shut down the pump or otherwise modify operational parameters of the pump.

In one embodiment, the wear detection and failure detection algorithms are performed simultaneously as loops that are executed automatically as measurement data is generated. For example, the method includes a fast acting alarm and emergency shutdown loop that continuously monitors for failure conditions corresponding to catastrophic events such as wash out of valves, seats, packing and or other components critical to pump integrity. The method also includes a wear detection loop that analyzes peak counts over a longer period of time to monitor the progressive wear of pump components.

Figure 1:
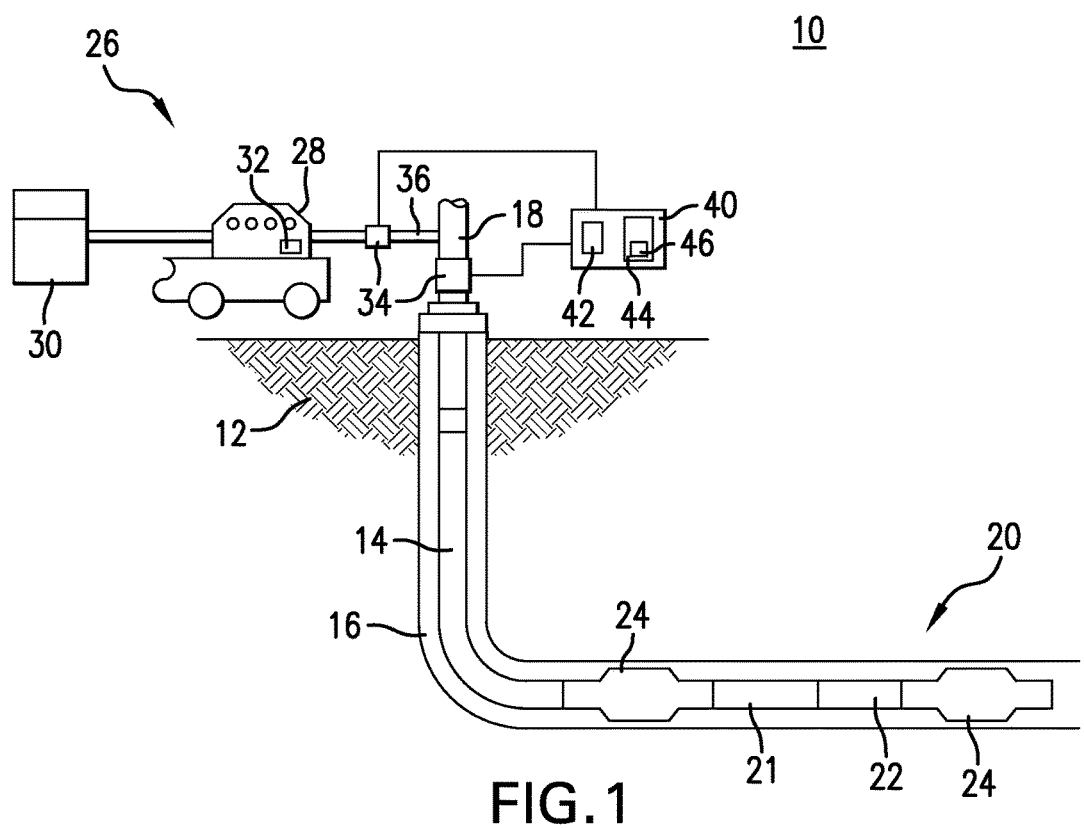
FIG. 1 depicts aspects of a hydraulic stimulation and/or production system 10.

Referring to FIG. 1, an exemplary embodiment of a hydrocarbon production and/or stimulation system 10 is configured to produce and/or stimulate production of hydrocarbons from an earth formation 12. A borehole string 14 is disposed in a borehole 16 that penetrates the formation 12. The borehole 16 may be an open hole, a cased hole or a partially cased hole. In one embodiment, the borehole string 14 is a stimulation or injection string that includes a tubular, such as a coiled tubing, pipe (e.g., multiple pipe segments) or wired pipe, that extends from a wellhead 18 at a surface location (e.g., at a borehole site or offshore stimulation vessel). The path and configuration of the borehole 16 shown in FIG. 1 is exemplary and not limited to specific embodiments described herein. For example, the borehole 16 may be of varying diameter and/or have any desired path or direction (e.g., azimuth and inclination), such as a vertical path, a horizontal path, a deviated path or any combination thereof.

As described herein, "string" refers to any structure or carrier suitable for lowering a tool or other component through a borehole or connecting a component to the surface, and is not limited to the structure and configuration described herein. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHAs and drill strings.

In one embodiment, the system 10 is configured as a hydraulic stimulation system. As described herein, "hydraulic stimulation" includes any injection of a fluid into a formation. A fluid may be any flowable substance such as a liquid or a gas, and/or a flowable solid such as sand. In this embodiment, the string 14 includes a stimulation assembly 20 that includes tools or components to facilitate stimulation of the formation 12, one or more of which may be incorporated in a bottomhole assembly (BHA). The system 10 and/or the borehole string 14 may also include various measurement tools and communication assemblies, one or more of which may be configured as part of a BHA.

For example, the stimulation assembly includes a fracturing assembly 21, such as a fracture or "frac" sleeve device, and/or a perforation assembly 22. The string 14 may also include additional components, such as one or more isolation or packer subs 24. One or more of the stimulation assembly 20, the fracturing assembly 21, the perforation assembly 22 and/or packer subs 24 may include or be connected to suitable electronics or processors configured to communicate with a surface processing unit and/or control the respective tool or assembly.

The system 10 includes surface assembly equipment such as an injection system 26 that is employed to stimulate the formation 12. The injection system 26 includes a pump 28, such as a high pressure frac pump, in fluid communication with a fluid tank 30, mixing unit or other fluid source or combination of fluid sources. The pump 28 injects fluid into the string 14 or the borehole 16 to introduce fluid into the formation 12, for example, to stimulate and/or fracture the formation 12.

Surface assembly equipment such as the injection system 26 typically includes an engine, cooling system, transmission, and a power end and fluid end of the pump 28. The engine or drive system of choice typically is a diesel engine but can be as well an electric drive. The transmission connects the engine and power end and provides speed control, dampening and allows for proper power distribution for the torque and horsepower required for a particular application.

One or more sensors are disposed at or near the one or more pumps to monitor pump operation. In one embodiment, the one or more sensors are configured to measure vibration of various components of the pump. For example, one or more accelerometers 32 are disposed on one or more components and/or in the pump 28. Signals from the accelerometer 32 can be used to generate time domain signals that can be processed and analyzed to determine vibrational behavior associated with the pump 28. Other sensors that may be used include a timing sensor 34 such as a proximity sensor or pump stroke sensor.

A processing unit 40 is connected in operable communication with components of the system 10 and may be located, for example, at a surface location. The processing unit 40 may also be incorporated with the borehole string 14 or a BHA, or otherwise disposed downhole as desired. The processing unit 40 may be configured to perform functions such as controlling pumping and other operational parameters, transmitting and receiving data, processing measurement data, monitoring operations, and performing simulations using mathematical models. In one embodiment, the processing unit 40 is connected to the pump 28 and/or sensors 32 and 34 to receive measurement data related to operation of the pump 28. The processing unit 40, in one embodiment, includes a processor 42 and a data storage device (or a computer-readable medium) 44 for storing, data, models and/or computer programs or software 46.

Figure 2:
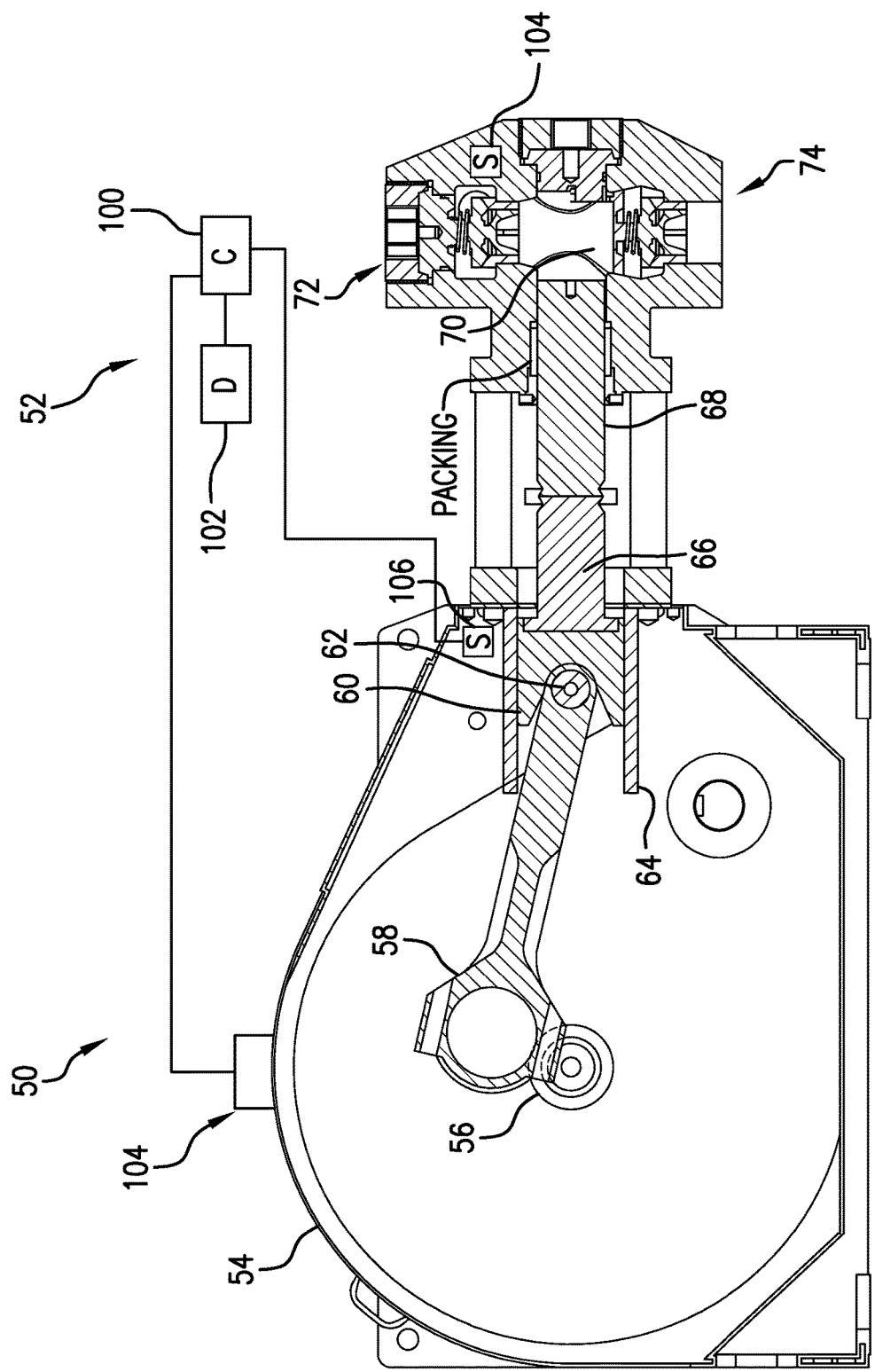
FIG. 2 depicts an example of a reciprocating fluid pump for use in a system such as the system of FIG. 1.
Figure 3:
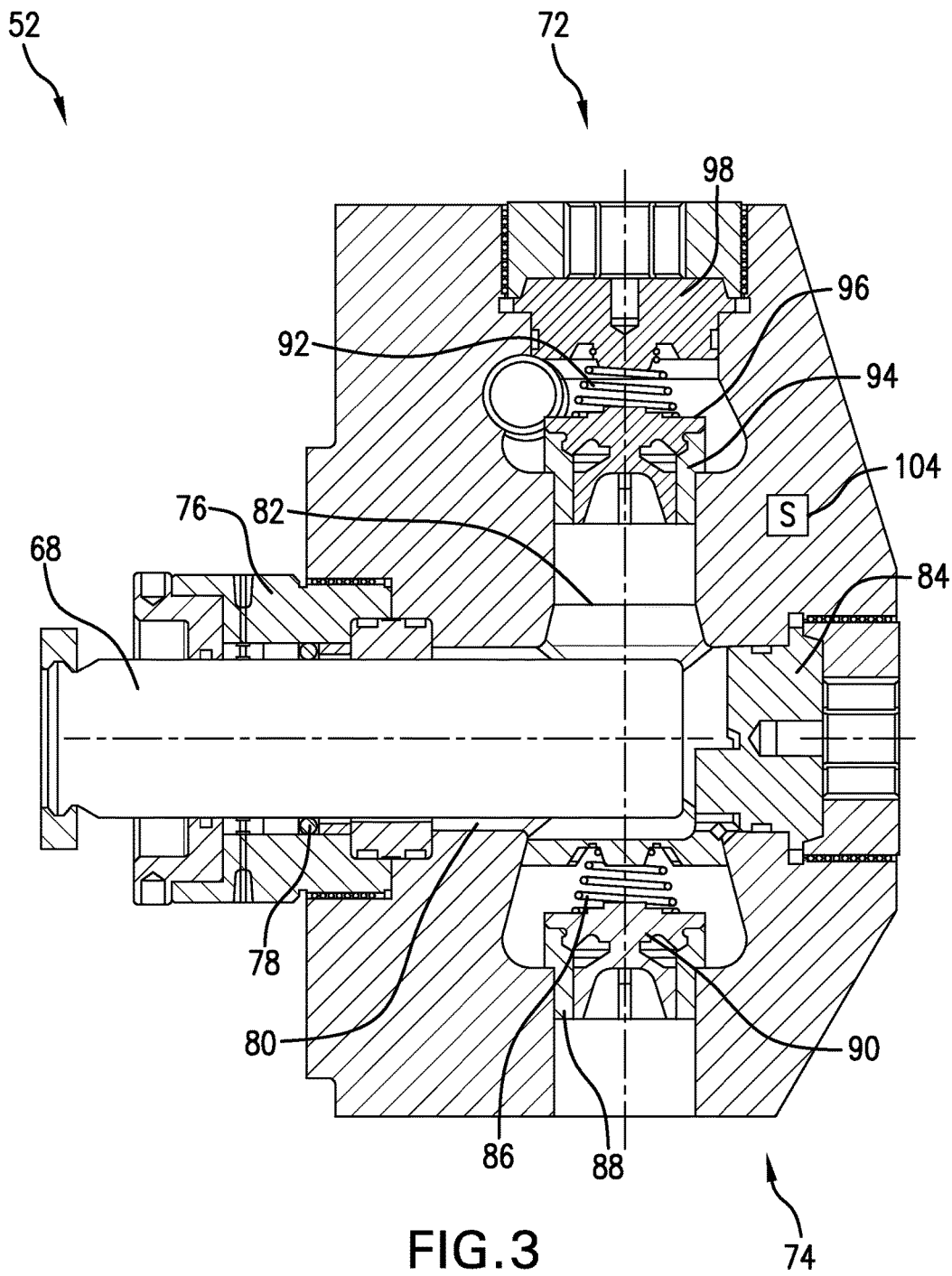
FIG. 3 depicts a fluid end of the pump of FIG. 2.

FIGS. 2 and 3 illustrate an example of a pump 28, which is applicable to the system 10 and may also be utilized in a variety of systems and operations that include pumping fluids. In this example, the pump 28 is a reciprocating pump that includes a power end 50 connected to a fluid end 52.

The power end 50 transforms rotational motion and energy from a prime mover into the reciprocating motion that drives plungers in the fluid end 52. The power end 50 includes a frame 54, a crank shaft 56, and a connecting rod 58 coupled to a cross head 60 and a wrist pin 62 in a fixed cylinder 64. A piston 66 is connected to a plunger 68 of the fluid end 52.

In the fluid end 52, the plunger 68 forces fluid into a pressure chamber 70 that is used to create high pressure for well servicing. The fluid end also includes a discharge valve assembly 72 and a suction valve assembly 74, which are shown in more detail in FIG. 2.

Referring to FIG. 3, the fluid end includes a stuffing box 76 and a packing assembly 78 to prevent leakage of fluid. The pressure chamber includes a horizontal bore 80 and a vertical bore 82. An end of the horizontal bore, referred to as the cover side, includes a suction cover 84 and is mainly used to repair and maintain chamber components. The bottom end of the vertical bore 82 is referred to as the suction side and houses components of the suction valve assembly 74, which includes a valve spring 86, a valve seat 88 and a suction valve 90.

The top end of the vertical bore 82 is referred to as the discharge side and houses components of the discharge valve assembly 72, which includes a valve spring 92, a discharge valve seat 94, a discharge valve 96 and a discharge cover 98. The suction side of each chamber is connected with a suction manifold, and the discharge side of each chamber is connected to discharge manifold.

Suction valves 90 and discharge valves 96 in each chamber and/or pump are pressure operated valves. Valve opening and closing depends upon factors including valve weight, spring force, valve geometry and pressure difference between the suction side and the discharge side. Each valve opens and closes once every revolution. The pump 28 may include or represent multiple pump and/or valve assemblies. For example, the pump 28 is a triplex pump that includes a total of six valve openings and six valve closing during one revolution of the power end.

The suction cover 84 and the stuffing box assemblies are needed to seal their respective opening. Seals and packing on the suction and discharge side experience cyclic pressure due to pump operation. A minor sizing (or dimensional tolerance) issue with the stuffing box or suction cover issues can lead to early failure of seals and/or packing. In addition to equipment failure, there is always a potential risk involved when working on high pressure equipment. Failure to service the pumps seals and packing can lead to permanent damage such as fluid end wash out, which can result in the failure of the relatively expensive fluid and require replacement.

A monitoring system is provided that receives measurements related to pump operation and monitors a pump or pump assembly (e.g., the pump 28 and/or other surface equipment) to estimate component wear and/or identify or predict failure of the pump or components thereof. The monitoring system includes a processor or processing device that receives data relating to measurements and analyzes vibrational characteristics to identify wear and/or failure conditions.

For example, as shown in FIG. 2, the monitoring system includes a processing unit 100 that includes a data acquisition (DAQ) system and a controller or processor that is connected to various sensors on the pump 28. The processing unit 100 includes or is connected to a display 102. A number of sensors are mounted on the pump 28 and communicatively connected to the processing unit 100. The sensors include accelerometers 104 mounted on the pump at locations such as those near the pressure chamber and various sealing assemblies. A timing sensor 106 such as a proximity sensor may also be mounted at the power end 50 to provide signals indicative of pump cycles.

The monitoring system allows a pump operator (human or processor) to monitor vibrations associated with the pump 28, identify wear and/or failure conditions, and take corrective action before a minor problem becomes a major failure. In one embodiment, the monitoring system is integrated into an equipment (e.g., pump and/or system 10 components) control system and is configured to alert a user to wear and/or failure conditions. In one embodiment, the monitoring system automatically adjusts operation of the pump, for example, by automatically triggering adjustments of operational parameters and/or potentially shutting down the pump to avoid catastrophic failure.

Processes and methods performed by the monitoring system and/or processor include receiving, processing and analyzing data received at least from a vibration sensor (e.g., an accelerometer, pressure sensor or acoustic sensor) to identify and/or predict pump conditions in real time during an operation (e.g., a drilling, production and/or stimulation operation). A timing sensor may be used to generate more precise measurements if desired. Data analyses involve multiple steps to process measurement data, including noise filtering, signal conditioning, frequency filtering and/or signal transformations. In one embodiment, the processed measurement data is compared against information from pre-recorded data and/or signals indicative of different conditions (referred to as "condition signals" or "reference signals"). For example, received data is filtered as discussed below and compared to reference signals associated with conditions of the pump. Such conditions include a good condition (i.e., no significant damage or wear that would compromise pump operation), a worn condition (i.e., a component such as a seal has worn down and should be replaced soon) and a failure condition (i.e., a component has failed and the pump should be shut down). The conditions are monitored and identified for a variety of pump components, such as valve assembly components (e.g., a valve and valve seat) and/or sealing components.

Figure 4:
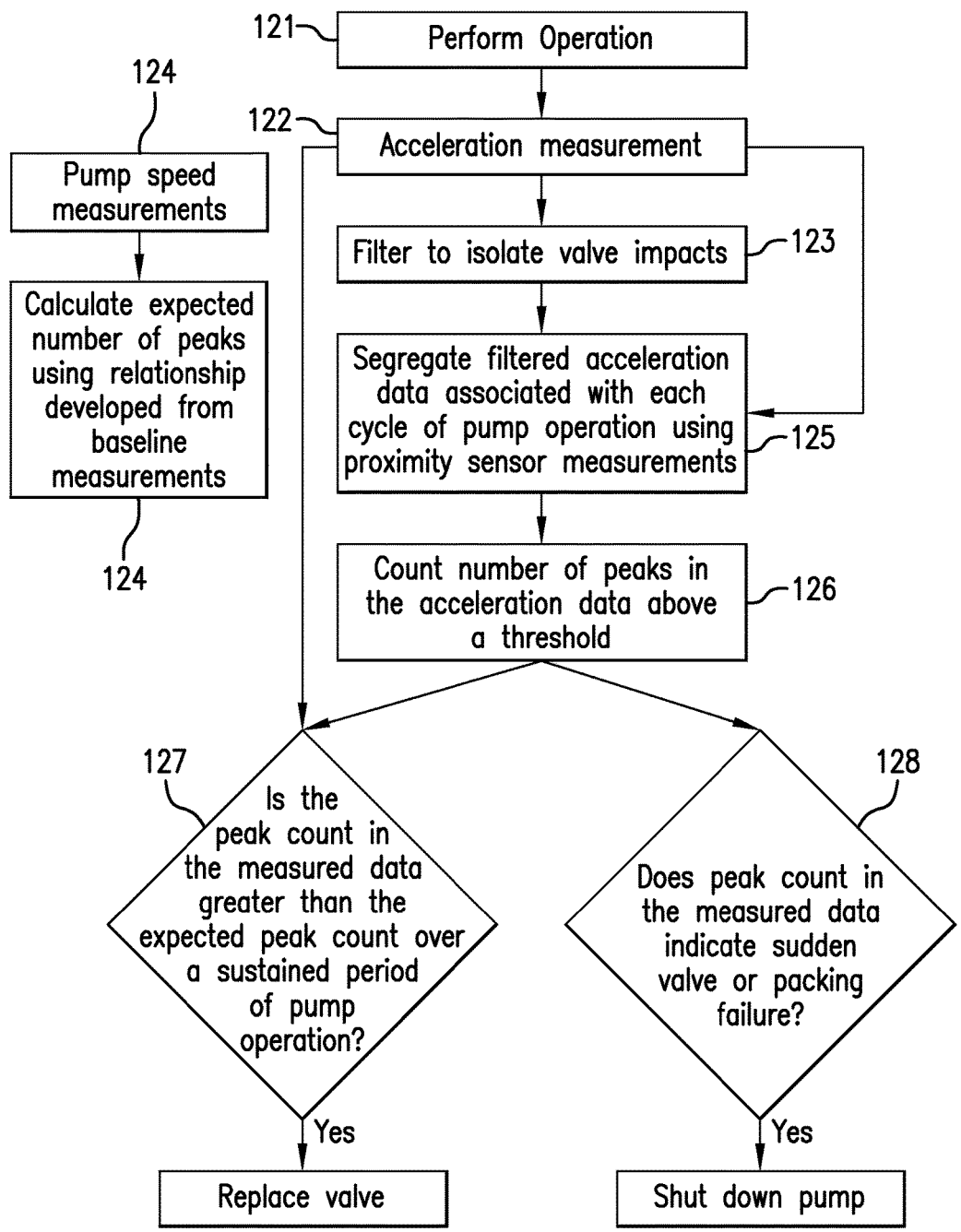
FIG. 4 is a flow chart depicting a method of monitoring a pumping device such as the pump of FIG. 2.

FIG. 4 illustrates a method 120 of monitoring a pumping device. The method 120 may be performed by any suitable processing or monitoring device or system, such as the surface processing unit 40 and/or processing unit 100. Although the method 120 is described in some examples as being performed in conjunction with the system 10, pump 28 and stimulation operations described herein, the method 120 is not limited to use with these embodiments, and may be used in conjunction with any suitable energy industry operation. For example, embodiments may be used in conjunction with drilling and/or logging-while-drilling operations. The method 120 includes one or more stages 121-128. In one embodiment, the method 120 includes the execution of all of stages 121-128 in the order described. However, certain stages may be omitted, stages may be added, or the order of the stages changed. In addition, some stages may be performed separately and/or concurrently over the course of a downhole operation. For example, stage 127 representing health monitoring may be performed independently of stage 128 representing washout or other failure monitoring. In one embodiment, stages 127 and 128 are performed simultaneously and in parallel during an operation so that a pump can be monitored for both wear and failure conditions.

In the first stage 121, components such as the borehole string 14 is disposed in the borehole, and a downhole operation is performed. An exemplary operation is a stimulation operation such as a hydraulic fracturing operation. During the operation, stimulation fluid or other type of fluid is injected into and/or circulated through the borehole 16 using one or more pumps 28.

In the second stage 122, various measurements are performed during the operation by sensors such as accelerometers, pressure sensors and/or acoustic sensors. The measurements provide measurement data to a processor in the form of time domain data values associated with vibrational characteristics of the pump. The processor receives time domain measurement data from at least one sensor disposed at a fluid pump, the measurement data indicating vibrations occurring in the fluid pump.

In one embodiment, the at least one sensor includes at least one accelerometer disposed proximate to at least one of the valve component and the sealing component. For example, accelerometers generate analog signals that are transmitted to the processor, such as the processing unit 100. The analog signals are sampled via, e.g., an analog-to-digital (A/D) converter) to provide a real time set of amplitude values.

In one embodiment, one or more timing sensors are used to detect each pump cycle and identify the pump stroke pattern. For example an inductive proximity sensor measures stroke events generated by the pump. The timing signal allows for identification of the pump speed and the temporal length of each pump cycle, which can be used for removal of signatures and data associated with the cyclical motion of pump components.

In the third stage 123, the received measurement data is processed and filtered to remove noise and isolate portions of the data related to impacts between components in the pump. The measurement data is filtered to remove measurement data components having frequencies below a threshold frequency, the removed measurement data components associated with cyclical motions of the fluid pump.

In one embodiment, a high-pass filter or other filter is applied to remove low frequency components of the measurement data associated with cyclical pump motions during normal pump operation. For example, the data is filtered to remove data components having a frequency below a selected threshold (e.g., a threshold between about 8 kHz and 18 kHz). The threshold frequency may be determined based on pre-existing information regarding the specific pump setup and planned operational parameters, and/or based on experimental data.

In the fourth stage 124, optional pump speed measurements are processed to estimate pump cycle characteristics. A proximity sensor or other timing sensor provides the signature and/or length of each pump cycle. Baseline measurements performed during an initial time of the operation (e.g., during a test phase) or derived from experimental data or other pre-existing information are used to calculate a threshold or baseline number of per-cycle data peaks in the filtered high frequency data.

In the fifth stage 125, the filtered data is segregated or divided according to pump cycle, e.g., using a proximity sensor or other timing sensor. The result is a set of acceleration or other data in the time domain for each pump cycle. In one embodiment, the processor divides the filtered measurement data into a plurality of subsets, each subset corresponding to a pump cycle. For example, as measurement data is received, the processor estimates times associated with a pump cycle and divides the received measurement data into subsets representing measurement data corresponding to each pump cycle.

In the sixth stage 126, a peak count is determined for each subset, the peak count being a number of peaks having an amplitude that exceeds a selected amplitude threshold, the amplitude threshold associated with impacts between internal components of the pump. The peak count is compared with an expected peak count, and it is determined whether the pump is in a condition selected from at least one of a wear condition and a failure condition based on the comparison. In one embodiment, the internal components include at least one of a valve component and a sealing component disposed in the pump.

In one embodiment, the number of peaks in the filtered data within each pump cycle is counted and compared to a threshold. The threshold is selected as indicative of normal operation and may be derived based on any available information. In one embodiment, the threshold is the expected number of peak counts calculated at stage 124. If the counted peaks do not equal or exceed the threshold, the filtered data and/or peak count information may be stored for later analysis and monitoring.

If the counted number of peaks over a selected or predetermined number of cycles meets or exceeds the threshold, the counted number of peaks is analyzed over an extended period of time to determine whether pump component wear (e.g., wear of seals, valves and/or valve seats) is occurring and/or whether component failure is indicated.

In the seventh stage 127, a wear detection method is performed to determine whether the pump is in a wear condition based on the comparison between the peak count and the expected peak count or other threshold value. In one embodiment, determining whether the pump is in the wear condition includes estimating the peak count over a plurality of pump cycles and calculating a trend of the peak counts. In another embodiment, determining whether the pump is in the wear condition includes estimating the peak count for each of a plurality of successive pump cycles, identifying a number of pump cycles having a peak count that exceeds the expected peak count, and determining that the pump is in the wear condition in response to the number of pump cycles exceeding a selected percentage of a total number of the plurality of successive pump cycles.

In one embodiment, the wear detection method is performed by continuously and automatically monitoring the filtered measurement data in real time. For each successive pump cycle, a number of peaks in an associated data subset is counted and compared to the per-cycle peak count threshold. If the counted number of peaks exceeds the threshold (e.g., the expected number of peaks) over a selected number of successive pump cycles, a worn condition is recognized and the processor may perform a number of actions. In response to determining that the pump is in the wear condition, the processor may notify a user that one or more of the internal components are worn and should be replaced. For example, the processor transmits or displays an alert or alarm that informs a user that components are worn and that such components should be replaced. In another example, the processor is configured to automatically adjust pump operational parameters, such as reducing pump speed or pressure, to avoid potential failure or damage.

The wear detection method can be used to continuously notify an operator and/or maintenance crews regarding the life status of pump components by analyzing various trends (such as slope of a least squares linear fit) in peak count data. The processor may also send out alarms with remaining life and/or status, such that crews and users can pro-actively plan, setup and execute preventative maintenance in the most operational efficient and cost effective way.

In the eighth stage 128, a failure detection method is performed to determine whether the pump is in a failure condition based on the comparison between the peak count and the expected peak count or other threshold value. In one embodiment, determining whether the pump is in the failure condition includes estimating the peak count for each pump cycle, comparing the peak count to a peak count threshold value that is greater than the expected peak count, and determining that the pump is in the failure condition in response to the peak count exceeding the peak count threshold value. In one embodiment, determining whether the pump is in the wear condition and determining whether the pump is in the failure condition are performed concurrently in real time during an energy industry operation.

In one embodiment, the failure detection method is performed by monitored the filtered data to detect sudden changes in vibration indicative of component failure or other conditions that require immediate action, such as shutting down the pump. The filtered data subset for each pump cycle is monitored by counting the number of peaks and/or measuring the amplitude of the counted peaks over a selected or pre-determined number of cycles. If the amplitude exceeds a selected threshold, or the amplitude changes by a selected amount over a selected time frame (e.g., between adjacent pump cycles), a failure condition is identified. In response to determining that the pump is in the failure condition, the processor may notifying a user that one or more of the internal components have failed, and/or automatically shut down the pump. For example, if the failure condition is identified, the processor may transmit or display an alarm indicating that a failure has occurred. In one embodiment, the processor is configured to automatically shut down the pump is response to the failure condition.

Figure 5:
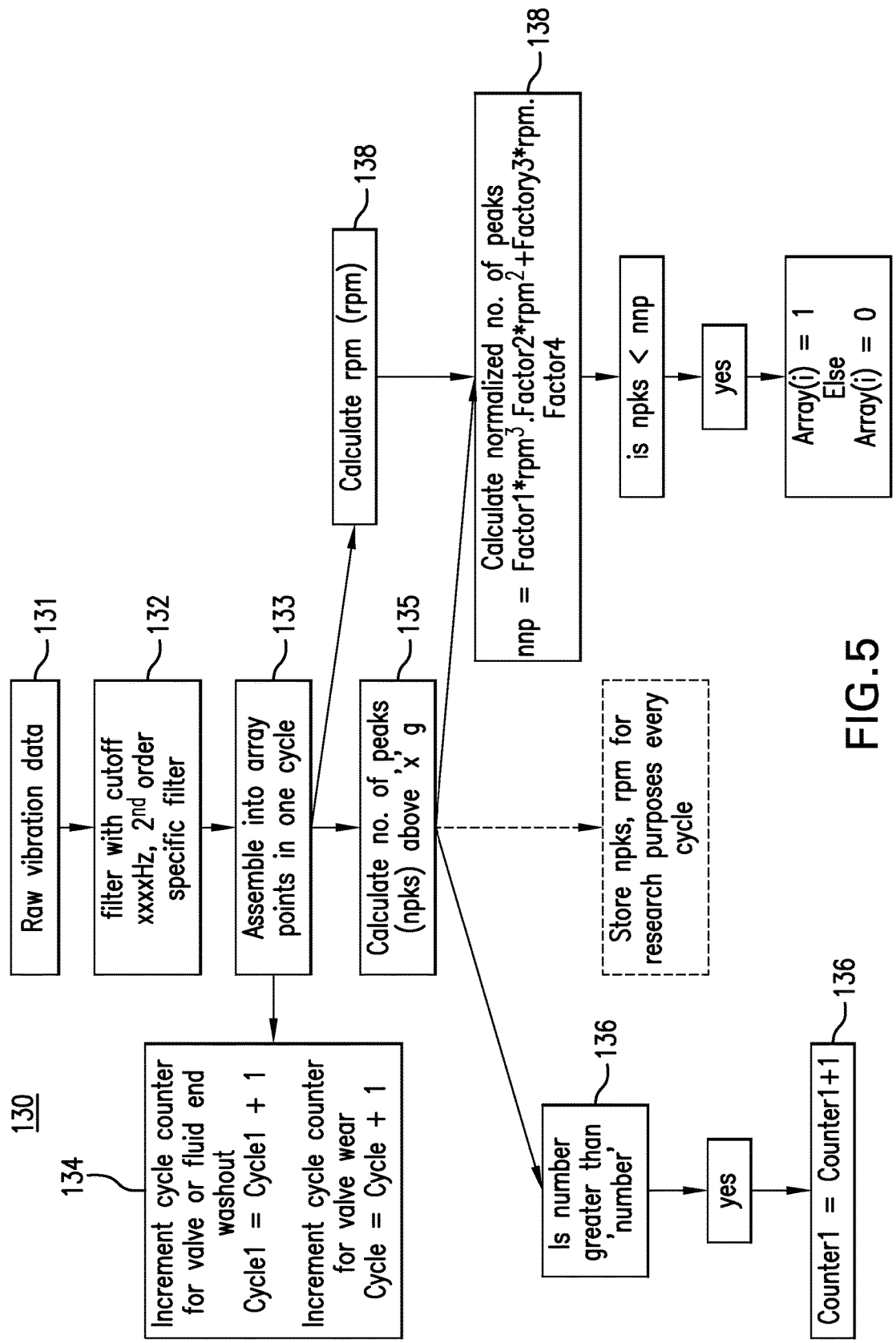
FIG. 5 is a flow chart depicting an embodiment of a method of processing and filtering measurement data.

FIG. 5 is a flow chart 130 illustrating aspects of the method related to processing and filtering measurement data, determining a peak count threshold and comparing peak counts to the threshold. These aspects may be performed as a portion of the method 120 (e.g., as part of stages 123-126). The filtering and processing may be performed in real time as data is received, and includes receiving raw vibration data at block 131, which is a time domain signal sampled from a sensor such as an accelerometer or acoustic sensor. At block 132, the raw vibration data is filtered with a cutoff frequency to remove lower frequencies and isolate frequencies associated with valve impacts and/or other vibrations due to impacts between internal components of a pump. A timing sensor or analysis of the vibration data is used to estimate the length of each pump cycle, and a subset of the filtered data for each cycle is assembled into an array at block 133. As each subset is processed, a cycle counter is incremented at block 134, and a per-cycle number of peaks ("npks") having an amplitude above a selected threshold amplitude is counted at block 135. The cycle counter may include separate cycle counters that are associated with wear detection and failure detection, respectively to keep track of the number of consecutive cycles used for each detection algorithm.

At block 136, the counted number of peaks is compared to a threshold number, and if the number of peaks exceeds the threshold number, a second counter is incremented to maintain a record of the number of cycles that includes a peak count exceeding the count threshold. If the count is lesser or equal than the expected value, the processor makes a record of the cycle without incrementing the second counter. For example, the per-cycle peak count is compared against a certain baseline value that has been previously established for valves in good condition at the measured operating speed. If the counted number exceeds the threshold number, the cycle counter is incremented and the second counter is incremented to store a cumulative running number of the total cycles analyzed and a number of cycles having a peak count above the peak count threshold.

In one embodiment, the counted number of peaks is normalized based on pump speed to account for changes in cycle length. For example, at block 137, the speed of the pump ("rpm") is calculated using the timing sensor data. A normalized number of peaks ("nnp") for each cycle is calculated by calculating normalization factors (block 138).

Figure 6:
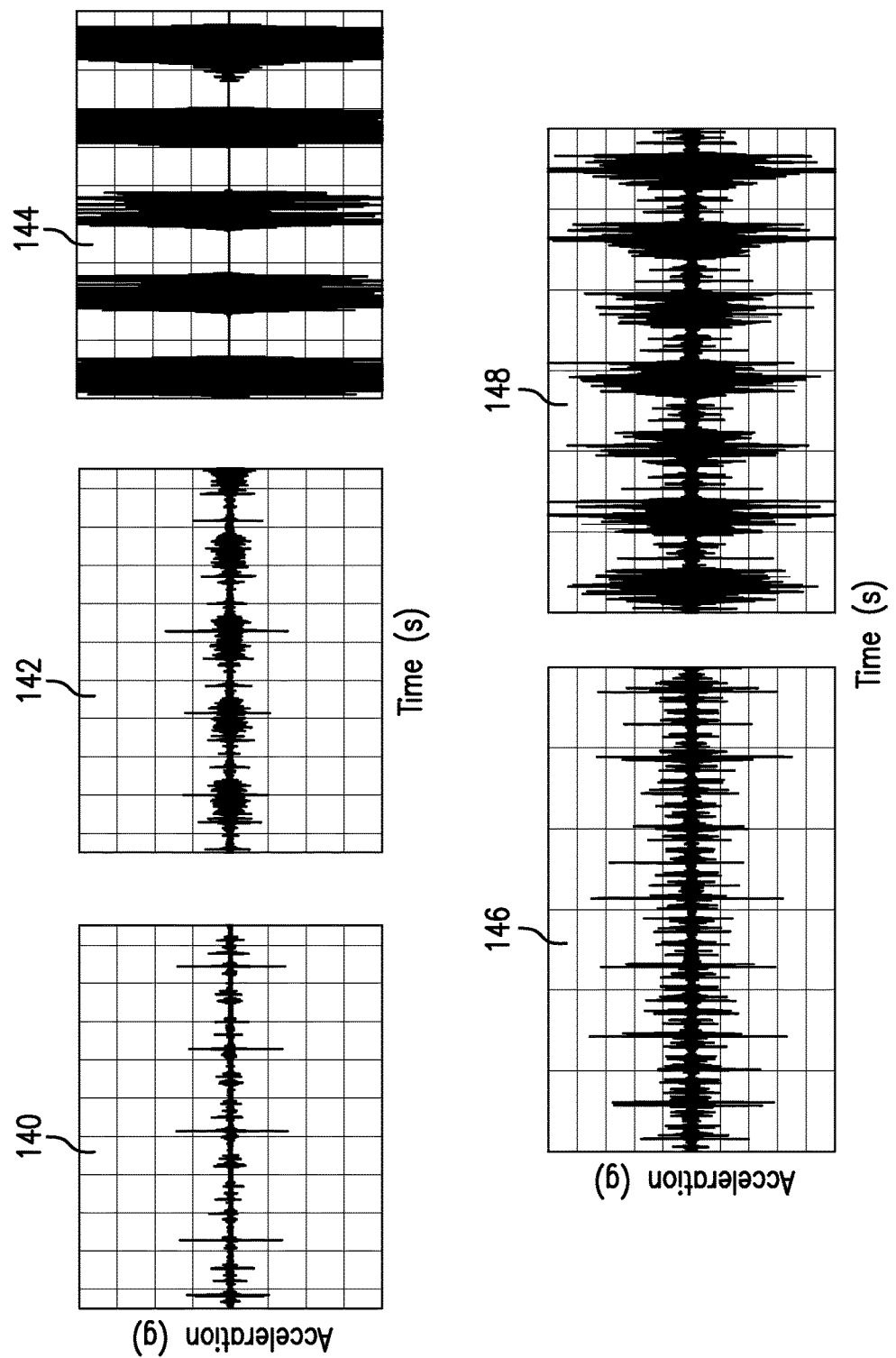
FIG. 6 depicts examples of filtered measurement data indicative of different conditions of a pump.

The peak count threshold can be selected to correspond to vibrations associated with operation of specific components of the pump, such as valves and sealing components. For example, FIG. 6 shows examples of measurement data corresponding to different operating conditions of a valve and fluid end packing. Acceleration measurements correspond to impacts of the valves on the valve seats are obtained by filtering the acquired accelerating signals. These impacts occur during the opening and closing of the suction and discharge side valves within the pump, which result in high frequency vibrations or stress wave propagations through the granular structure of the metallic parts of the pump. As the elastomer in the valves wear out, the degree of metal to metal contact associated with valve closings and openings increase. Additionally, when the elastomer wear levels increase, the valves bounce more due to ineffective sealing. These events result in a net increase in the number and intensity of impacts and associated vibration cycles. FIG. 6 illustrates the increase in the number and intensity of peaks that occur in accelerometer measurement amplitudes over time due to these events that result from increases in valve wear. Graph 140 shows acceleration data resulting from operation using a good (substantially unworn) valve, graph 142 shows acceleration data associated with a worn valve, and graph 144 shows acceleration data associated with a failed or destroyed valve. Furthermore, when sealing components such as fluid end packing fails, a high level in the acceleration peak count parameter is observed, an example of which is shown in FIG. 6, where graph 146 is associated with intact fluid end packing and graph 148 is associated with failed packing. In either case, the number and intensity of the peaks (defined as a point that is greater in magnitude than its neighboring points) associated with valve impacts in the accelerometer measurements is correlated well to the condition of the valve as well as the fluid end packing.

Figure 7:
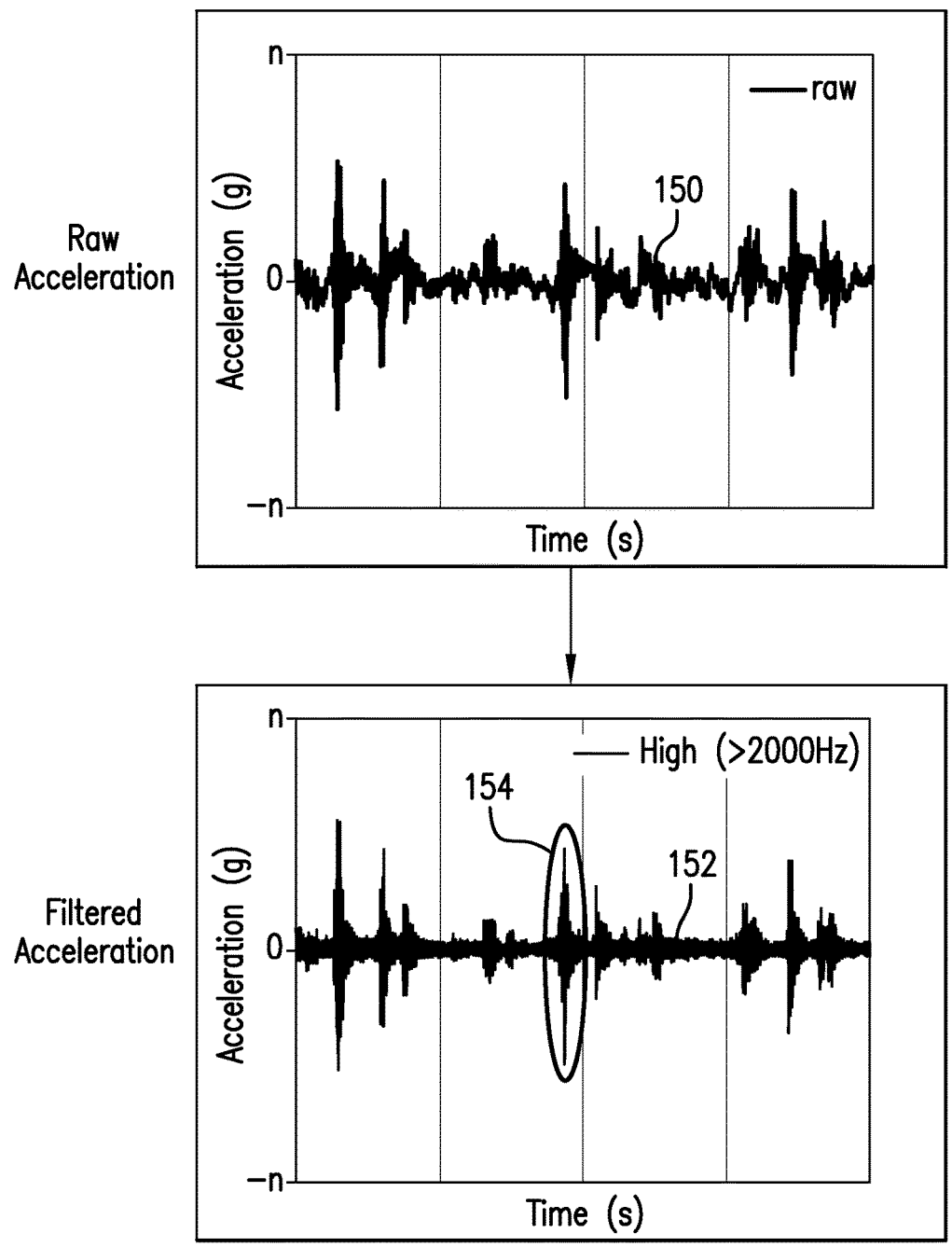
FIG. 7 depicts an example of raw measurement data and filtered data generated according to embodiments described herein.
Figure 8:
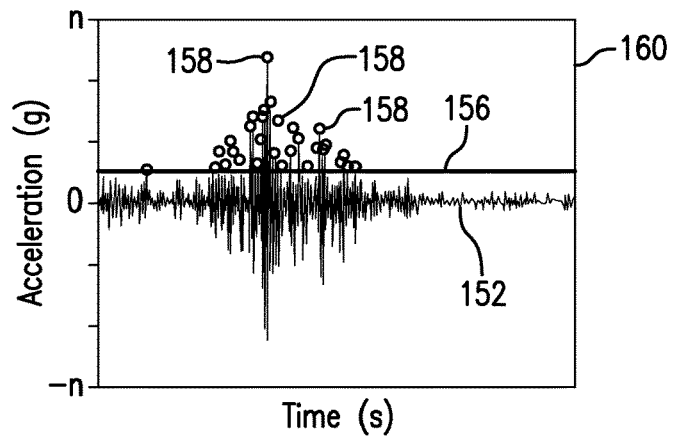
FIG. 8 depicts an example of determining per-cycle peak counts of the data of FIG. 7.
Figure 8:
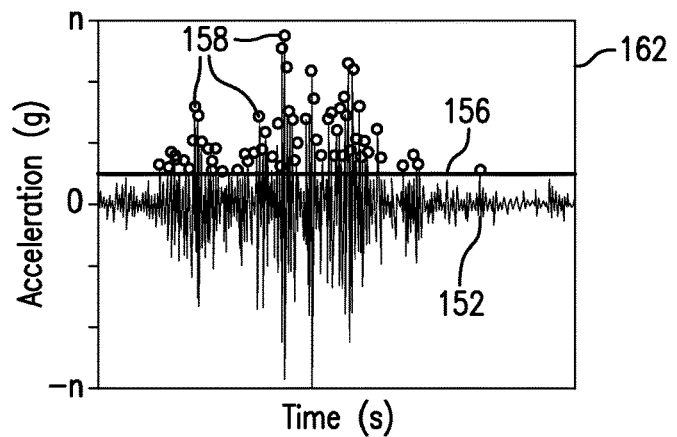
Figure 8:
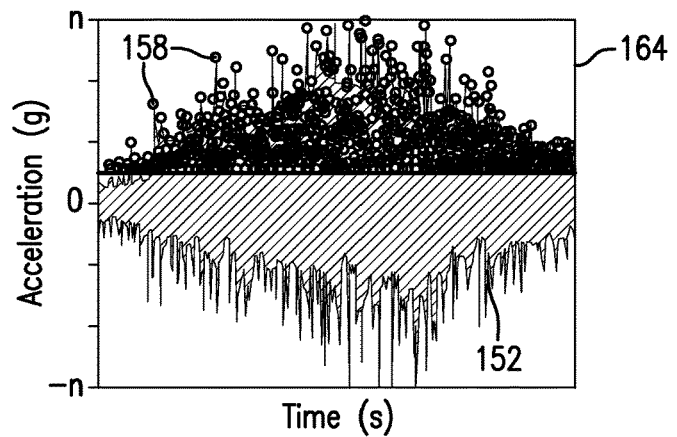

An example of peak count number calculation is shown in FIGS. 7 and 8. FIG. 7 shows raw acceleration data 150, and filtered data 152 generated using filtering and processing embodiments described herein. In this example, frequency components below a frequency threshold have been filtered out of the raw acceleration data 150 to isolate data related to valve and other internal pump component impacts. This frequency threshold is exemplary and may be any selected threshold sufficient to remove low frequency data components due to pump cycle movements and/or isolate impacts. A time window 154 corresponding to a selected pump cycle is selected.

As shown in FIG. 8, a threshold amplitude value 156 is selected and the number of peaks 158 having amplitudes above the threshold is counted. For a normal, relatively unworn or good condition (shown in graph 160), the number of counted peaks is relatively low, in this example equal to 36. For a worn valve condition (shown in graph 162), the number of counted peaks 158 is higher, in this example equal to 68. For a failed or destroyed condition (shown in graph 164), the peak count is extremely high (in this example greater than 1000), and the amplitudes of the counted peaks are also very high relative to the other conditions. As shown in this example, counting the number of peaks according to embodiments described herein provides a reliable indicator of wear and failure conditions. It is noted that the number of peaks is not necessarily corresponding to the frequency at which the peaks appear.

Figure 9:
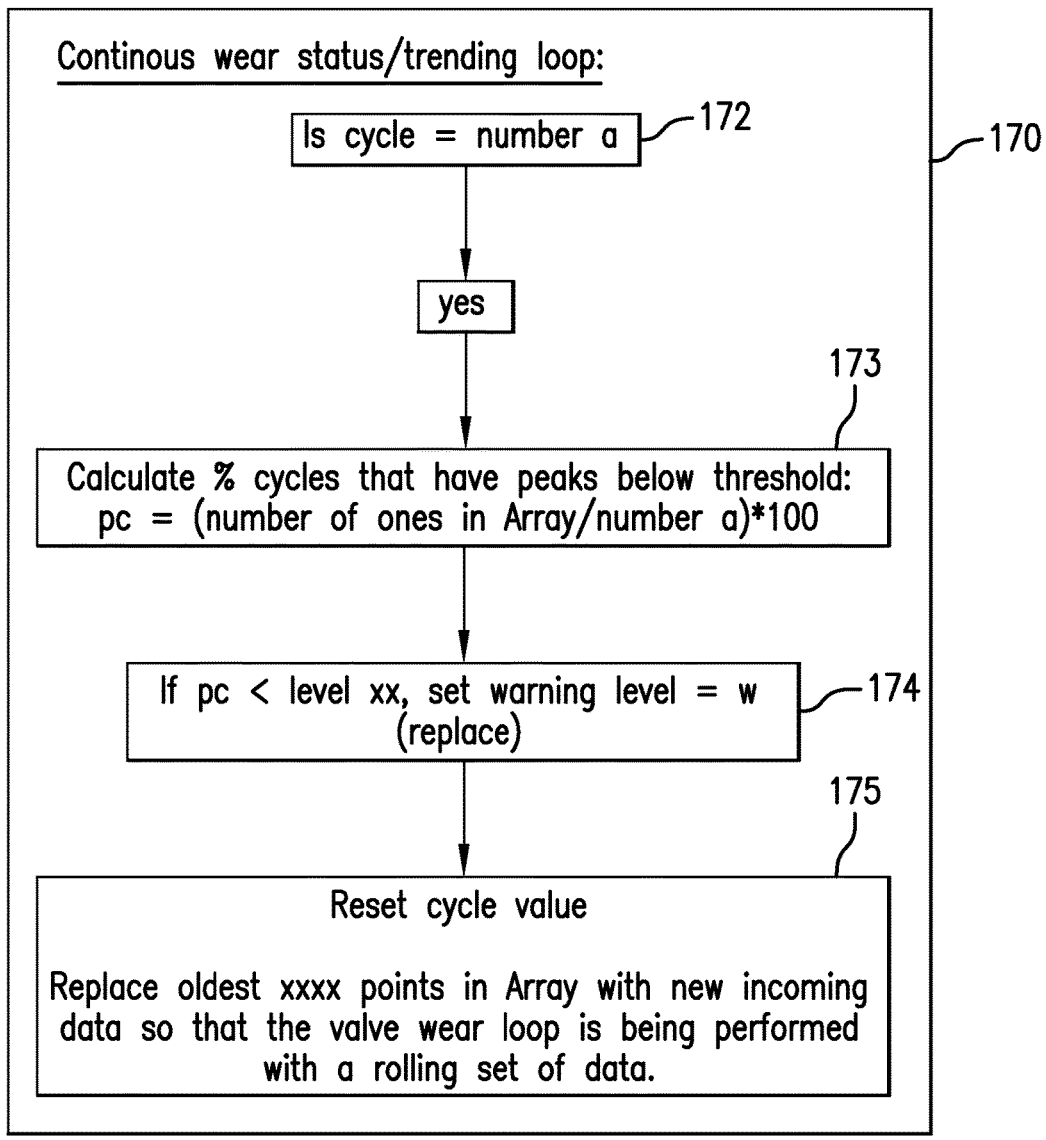
FIG. 9 is a flow chart depicting an embodiment of a wear detection method.

FIG. 9 is a flow chart 170 illustrating an embodiment of the wear detection method and associated algorithm, that provides a periodic or continuous (e.g., per cycle and/or sampling or time step) method of identifying wear conditions. The wear detection method may be an embodiment of stage 127 of the method 120.

The wear detection method includes identifying consecutive cycles based on e.g., timing measurements. A sufficiently large number "a" of cycles (e.g., 1500) is selected so that the progression of wear over a period of time is monitored. For each cycle, the corresponding subset is analyzed and a number of peaks is counted and compared to a peak count threshold number corresponding to an expected value (e.g., 36). If the peak count for a subset exceeds the expected value, the associated cycle is counted to maintain a sum of cycles identified as having a peak count exceeding the threshold. Once the total number of cycles reaches the selected number "a" (block 171), the number of consecutive cycles for which the counted number of peaks does not exceed the threshold is compared to the total number "a" of cycles, and a percentage of cycles ("pc") is calculated at block 172 by dividing the number of cycles by the total number of consecutive cycles. If the percentage "pc" is less than a selected percentage (thereby indicating that a relatively high percentage of cycles have a number of peaks exceeding the threshold), a warning or alarm indication is set at block 173. At block 174, appropriate counters are reset and the wear detection method is repeated for the next set of cycles. In one embodiment, the oldest data points are replaced with new incoming data so that the method is performed with a rolling set of data.

Figure 10:
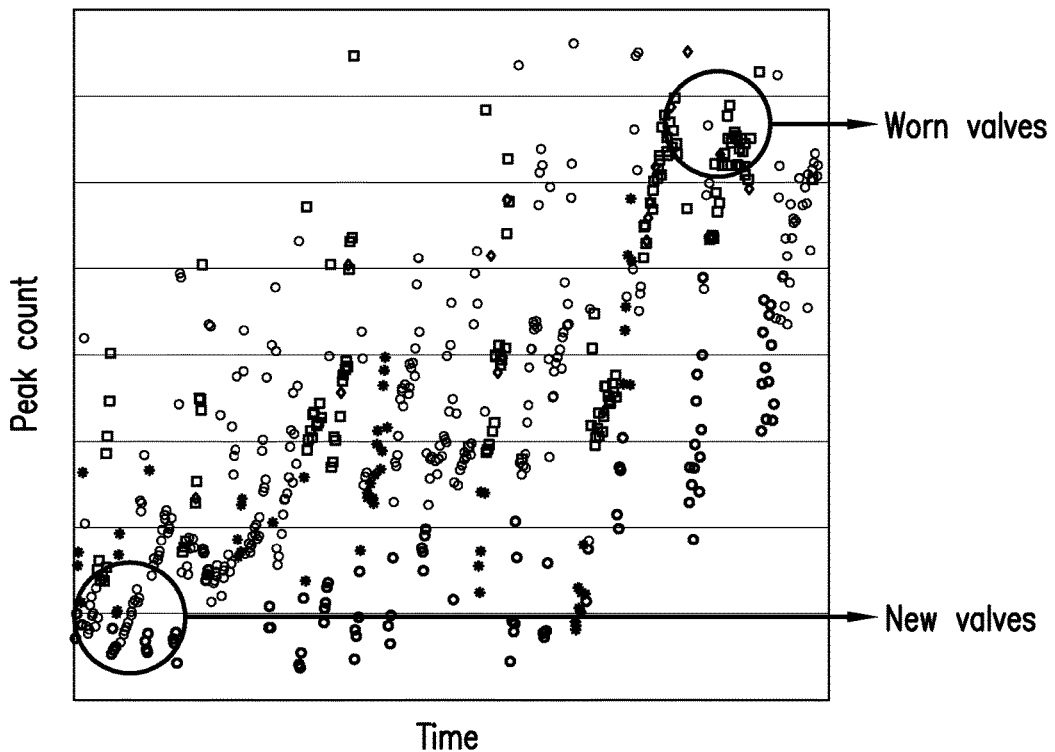
FIG. 10 is an example of peak count data generated using the method of FIG. 9.

An example of count data generated using the wear detection method is shown in FIG. 10, which illustrates the peak count per cycle over time. In this example, the peak count steadily increases until the percentage or number of cycles for which the peak count exceeds the peak count threshold reaches a level that is indicative of a worn valve or valves.

Figure 11:
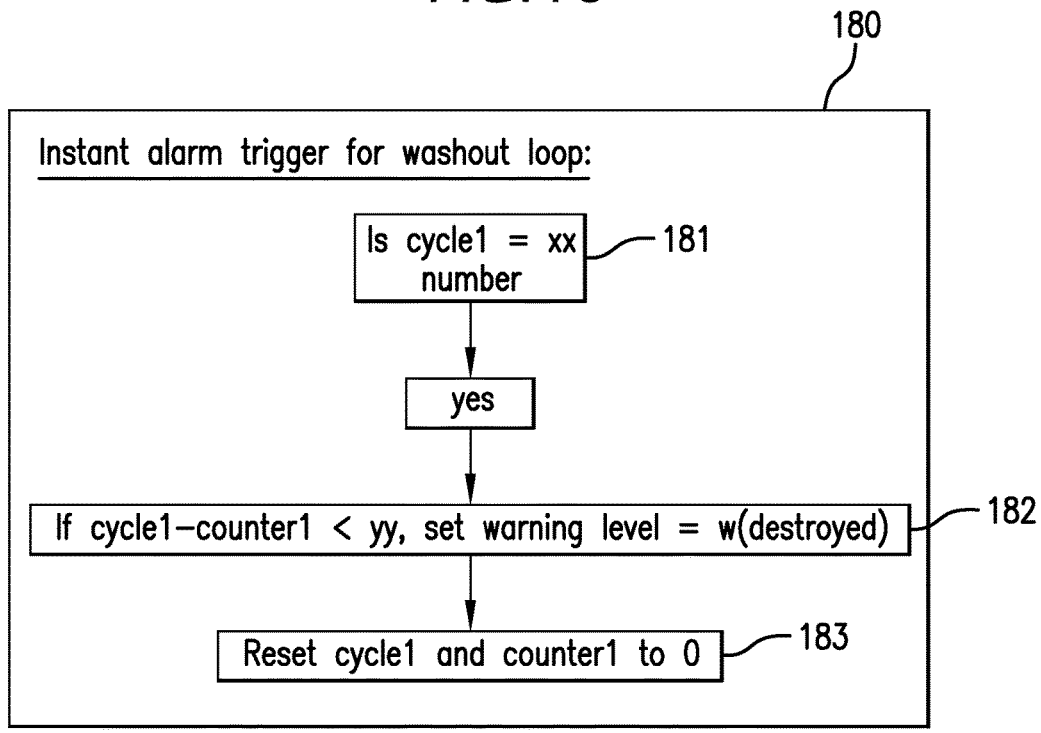
FIG. 11 is a flow chart depicting an embodiment of a failure detection method.

In addition to monitoring gradual progression of valve wear in the pump according to the wear detection method, the processor may be configured to monitor the pump for failure of valves, sealing components or other internal components. FIG. 11 is a flow chart 180 illustrating an embodiment of the failure detection method, which is used to detect a failure condition such as a wash out. The failure detection method may be an embodiment of stage 128 of the method 120. The failure detection method may be performed simultaneously and/or concurrently with the wear detection method.

The failure detection method is used to continuously monitor the pump for valve failure (i.e. separation of the elastomer part of the valve), fluid end packing failure and/or other pump component failure.

The algorithm shown in FIG. 11 represents a fast acting loop, as the algorithm is performed for a significantly fewer number of cycles (or for individual cycles) relative to wear detection. At each cycle over the loop duration, the cycle count is incremented (at block 181) and the number of peaks above a number threshold is counted. If the number of peaks exceeds a threshold number, the amplitude of the peaks (e.g., highest peak amplitude, average peak amplitude or other statistical or mathematical calculation) is calculated and compared to an amplitude threshold. If the peak amplitude exceeds the amplitude threshold, a counter is incremented to record the number of cycles for which the peak amplitude exceeds the threshold amplitude. This number of cycles is subtracted from the total number of cycles, and if the result is less than a selected value, a failure condition is identified and a warning or other action is performed (block 182). For example, once the algorithm detects a catastrophic event the system will immediately notify the operator and/or optionally automatically initiate and emergency shutdown.

The cycle counter and cycle number are then reset (block 183) and the method is performed for the next set of cycles. The method shown in flow chart 180 may be a secondary loop that monitors the per-cycle peak count relative to a peak number threshold (e.g., 1500) that is much higher than the peak number threshold for the wear detection loop.

Figure 12:
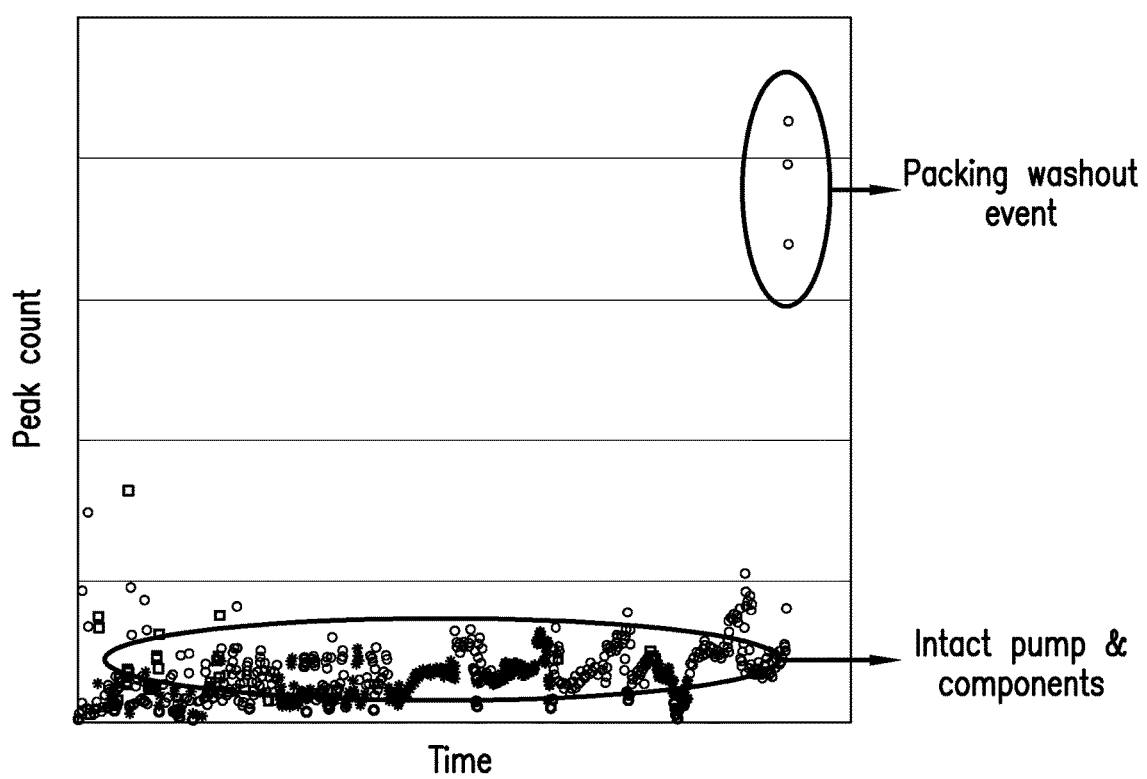
FIG. 12 is an example of peak count data generated using the method of FIG. 11.

An example of count data generated using the failure detection method or loop is shown in FIG. 12, which illustrates the peak count per cycle over time. In this example, the peak count remains relatively steady but then quickly or suddenly increases by a large amount. This sudden increase is effectively and immediately detected using the failure detection method shown in FIG. 11.

The systems and methods described herein provide various advantages over prior art techniques. For example, embodiments described herein allow for automatic and rapid detection of wear and/or failure conditions that can both increase the efficiency of operations and prevent damage to equipment. In addition, the embodiments do not require that amount of time and processing power required by prior art methods such as those that use Fourier transforms to analyze frequency characteristics.

In addition, the embodiments provide means to monitor equipment integrity by targeting or focusing on vibration characteristics specific to internal components of a pump, thus allowing for quick and accurate detection of problems irrespective of changes in pump cycles, noise sources and vibrations due to cyclical motion of the pump. For example, the knowledge of valve, valve seat, seal and packing damage levels can mitigate fluid end washout and premature removal of valves, seats and packing.

In support of the teachings herein, various analysis components may be used, including digital and/or analog systems. The digital and/or analog systems may be included, for example, in downhole components, surface equipment and/or the surface processing unit 40. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMS, USB flash drives, removable storage devices), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of monitoring a fluid pump, the method comprising:
   receiving time domain measurement data from an accelerometer disposed on a valve of a fluid pump, the measurement data comprising vibrations occurring in the fluid pump created by impacts of the valve;
   filtering the measurement data to remove measurement data components that are associated with cyclical motions of the fluid pump and that have frequencies below a threshold frequency;
   dividing the filtered measurement data into a plurality of subsets, each subset corresponding to a pump cycle;
   estimating a peak count for each subset, the peak count being a number of peaks having an amplitude that exceeds a selected amplitude threshold, the amplitude threshold associated with the impacts of the valve;
   comparing the peak count with an expected peak count;
   determining whether the pump is in a condition selected from at least one of a wear condition and a failure condition based on the comparison;
   indicating a wear condition when it is determined that the pump is in a wear condition, and indicating a failure condition when it is determined that the pump is in a failure condition; and
   operating the pump based on what is indicated.

2. The method of claim 1, wherein the time domain measurement data is real time data collected during a hydraulic stimulation operation, and the determining is performed in real time during the operation.

3. The method of claim 1, further comprising using an inductive proximity sensor to identify a speed and temporal length of a cycle of the pump.

4. The method of claim 1, wherein the step of filtering isolates signals at frequencies associated with valve impacts.

5. The method of claim 1, wherein determining whether the pump is in the wear condition includes estimating the peak count over a plurality of pump cycles and calculating a trend of the peak counts.

6. The method of claim 1, wherein determining whether the pump is in the wear condition includes:
   estimating the peak count for each of a plurality of successive pump cycles;
   identifying a number of pump cycles having a peak count that exceeds the expected peak count; and
   determining that the pump is in the wear condition in response to the number of pump cycles exceeding a selected percentage of a total number of the plurality of successive pump cycles.

7. The method of claim 1, wherein determining whether the pump is in the failure condition includes:
   estimating the peak count for each pump cycle;
   comparing the peak count to a peak count threshold value that is greater than the expected peak count;
   determining that the pump is in the failure condition in response to the peak count exceeding the peak count threshold value.

8. The method of claim 1, wherein determining whether the pump is in the wear condition and determining whether the pump is in the failure condition are performed concurrently in real time during an energy industry operation.

9. The method of claim 1, further comprising, replacing a worn component where there is an indication of a wear condition.

10. The method of claim 1, wherein the pump operation is automatically terminated when there is an indication of a failure condition.

11. A system for pressurizing fluid comprising:
   a fluid pump comprising an internal component and a discharge in communication with a borehole;
   at least one sensor that is responsive to vibrations of the pump, that is responsive to vibrations of the internal component, and that is strategically located to be sensitive to the vibrations of the internal component; and
   a processor configured to perform:
     receiving time domain measurement data from the at least one sensor, the measurement data indicating the vibrations occurring in the fluid pump and vibrations of the internal component;
     filtering the measurement data to remove measurement data components associated with cyclical motions of the fluid pump;
     dividing the filtered measurement data into a plurality of subsets, each subset corresponding to a pump cycle;
     estimating a peak count for each subset, the peak count being a number of peaks having an amplitude that exceeds a selected amplitude threshold, the amplitude threshold associated with impacts of the internal components;
     comparing the peak count with an expected peak count;
     determining whether the internal component is in a condition selected from at least one of a wear condition and a failure condition based on the comparison; and
     indicating a wear condition when it is determined that the internal component is in a wear condition, and indicating a failure condition when it is determined that the internal component is in a failure condition so that an operation of the pump is changed based on what is indicated.

12. The system of claim 11, wherein the time domain measurement data is real time data collected during an energy industry operation, and the determining is performed in real time during the operation.

13. The system of claim 11, wherein the pump is a positive displacement pump.

14. The system of claim 13, wherein the internal component comprises an a valve, and wherein the at least one sensor comprises an accelerometer disposed on the valve.

15. The system of claim 13, wherein the internal component comprises a sealing component, and wherein the at least one sensor comprises an accelerometer disposed proximate to the sealing component.

16. The system of claim 11, wherein determining whether the internal component is in the wear condition includes:
   estimating the peak count for each of a plurality of successive pump cycles;
   identifying a number of pump cycles having a peak count that exceeds the expected peak count; and
   determining that the interim component pump is in the wear condition in response to the number of pump cycles exceeding a selected percentage of a total number of the plurality of successive pump cycles.

17. The system of claim 16, wherein determining whether the internal component is in the failure condition includes:
  estimating the peak count for each pump cycle;
  comparing the peak count to a peak count threshold value that is greater than the expected peak count;
  determining that the internal component is in the failure condition in response to the peak count exceeding the peak count threshold value.

18. The system of claim 17, wherein determining whether the internal component is in the wear condition and determining whether the internal component is in the failure condition are performed concurrently in real time during an energy industry operation.

19. The system of claim 11, wherein the processor is configured to further perform, in response to determining that the internal component is in the wear condition, notifying a user the internal component is worn and should be replaced.

20. The system of claim 11, wherein the processor is configured to further perform, in response to determining that the internal component is in the failure condition, performing at least one of:
  notifying a user that the internal component has failed; and
  automatically shutting down the pump by the processor.

* * * * *

UNITED STATES PATENT AND TRADEMARK OFFICE
CERTIFICATE OF CORRECTION

Page 1 of 1

PATENT NO.        : 10,317,875 B2
APPLICATION NO.   : 14/871641
DATED             : June 11, 2019
INVENTOR(S)       : Pradeep Pandurangan et al.

It is certified that error appears in the above-identified patent and that said Letters Patent is hereby corrected as shown below:

In the Claims

In Claim 11, Column 14, Line 31 the claim language reads: "components;" - It should read: "component;"

In Claim 14, Column 14, Line 51 the claim language reads: "comprises an a valve," - It should read: "comprises a valve,"

In Claim 16, Column 14, Line 64 the claim language reads: "determining that the interim component pump is in the" - It should read: "determining that the internal component is in the"

Signed and Sealed this
Twenty-first Day of January, 2020

Andrei Iancu
*Director of the United States Patent and Trademark Office*